(12) United States Patent
Yanata

(10) Patent No.: US 9,046,622 B2
(45) Date of Patent: Jun. 2, 2015

(54) IMAGE FORMING APPARATUS

(71) Applicant: Toshio Yanata, Kanagawa (JP)

(72) Inventor: Toshio Yanata, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 13/974,510

(22) Filed: Aug. 23, 2013

(65) Prior Publication Data

US 2014/0064770 A1   Mar. 6, 2014

(30) Foreign Application Priority Data

Aug. 28, 2012 (JP) ................................. 2012-187204

(51) Int. Cl.
*G03G 15/00* (2006.01)
*G01V 8/10* (2006.01)

(52) U.S. Cl.
CPC .............. *G01V 8/10* (2013.01); *G03G 15/5025* (2013.01); *G03G 15/5058* (2013.01); *G03G 2215/0897* (2013.01)

(58) Field of Classification Search
USPC .......................................................... 399/74
See application file for complete search history.

(56) References Cited

U.S. PATENT DOCUMENTS

| | | | |
|---|---|---|---|
| 5,073,407 A * | 12/1991 | Frazer ............................ | 427/160 |
| 6,128,461 A * | 10/2000 | Yoshikawa ..................... | 399/350 |
| 6,181,890 B1 * | 1/2001 | Kataoka et al. .................. | 399/67 |
| 6,636,719 B2 * | 10/2003 | Kunishi et al. ................. | 399/343 |
| 7,609,315 B2 * | 10/2009 | Kawai ............................. | 348/340 |
| 7,706,705 B2 * | 4/2010 | Tomita et al. ..................... | 399/49 |
| 7,978,220 B2 * | 7/2011 | Urakami et al. ......... | 348/207.99 |
| 8,041,281 B2 * | 10/2011 | Sugimoto et al. ............. | 399/354 |
| 8,218,059 B2 * | 7/2012 | Kawai ........................... | 348/340 |
| 2008/0131150 A1 * | 6/2008 | Tomita et al. .................... | 399/39 |
| 2010/0158501 A1 * | 6/2010 | Kawai ............................ | 396/448 |
| 2010/0220394 A1 * | 9/2010 | Kawai ............................ | 359/508 |
| 2011/0103815 A1 * | 5/2011 | Hanashi .......................... | 399/49 |
| 2012/0008974 A1 * | 1/2012 | Kawai et al. .................... | 399/71 |
| 2012/0033982 A1 * | 2/2012 | Kubota et al. ................... | 399/27 |
| 2013/0142501 A1 * | 6/2013 | Yasuda et al. .................... | 396/50 |

FOREIGN PATENT DOCUMENTS

| | | |
|---|---|---|
| JP | 2005-070676 | 3/2005 |
| JP | 2010-026157 | 2/2010 |
| JP | 2010-210765 | 9/2010 |

* cited by examiner

*Primary Examiner* — Rodney Fuller
(74) *Attorney, Agent, or Firm* — Harness, Dickey & Pierce P.L.C.

(57) ABSTRACT

An optical sensor, which can be included in an image forming apparatus, includes a detecting portion disposed facing a detection target and configured to detect the detection target by emitting light to the detection target, a dust-proofing member having a surface disposed facing the detection target and configured to cover the detecting portion, a vibration member configured to vibrate the surface of the dust-proofing member, and a collecting member configured to collect dust in the vicinity of the dust-proofing member. On the surface of the dust-proofing member facing the detection target, at least a portion that intersects a pathway of light emitted from the detection portion is formed as a thru-beam part by a material through which the light transmits.

7 Claims, 3 Drawing Sheets

IMAGE FORMING APPARATUS

CROSS-REFERENCE TO RELATED APPLICATIONS

This patent application is based on and claims priority pursuant to 35 U.S.C. §119 to Japanese Patent Application No. 2012-187204, filed on Aug. 28, 2012 in the Japan Patent Office, the entire disclosure of which is hereby incorporated by reference herein.

BACKGROUND

1. Technical Field

Embodiment of the present invention relate to an optical sensor unit that detects density of an image formed on an image carrier and a position of an end portion of the image, and an image forming apparatus incorporating the optical sensor unit.

2. Related Art

Known image forming apparatuses form image density detection patterns and/or image displacement detection patterns on an image carrier to read these patterns by an optical sensor unit for correcting a density and a write timing of an image.

Some of these image forming apparatuses include a cleaning mechanism that removes flying foreign materials and/or residual toner remaining on optical parts such as a light source and a light receiving element of the optical sensor unit.

For example, Japanese Patent No. JP-4312547-B (JP-2005-070676-A) discloses a shutter that prevents adhesion of toner scattered to a detection surface of an image density detector that can detect density detection patterns formed on the surface of an intermediate transfer belt and a compression spring that links movement of the shutter with movement of a recording medium transfer unit.

SUMMARY

The present invention provides an optical sensor unit including a detecting portion disposed facing a detection target and configured to detect the detection target by emitting light to the detection target, a dust-proofing member having a surface disposed facing the detection target and configured to cover the detecting portion, a vibration member configured to vibrate the surface of the dust-proofing member, and a collecting member configured to collect dust in the vicinity of the dust-proofing member. On the surface of the dust-proofing member facing the detection target, at least a portion that intersects a pathway of light emitted from the detection portion is formed as a thru-beam part by a material through which the light transmits.

Further, the present invention provides an image forming apparatus an image forming unit including an image carrier to form an image pattern on the image carrier, and the above-described optical sensor disposed facing the image carrier.

BRIEF DESCRIPTION OF THE DRAWINGS

A more complete appreciation of the invention and many of the advantages thereof will be obtained as the same becomes better understood by reference to the following detailed description when considered in connection with the accompanying drawings, wherein.

DETAILED DESCRIPTION

Figure 1:
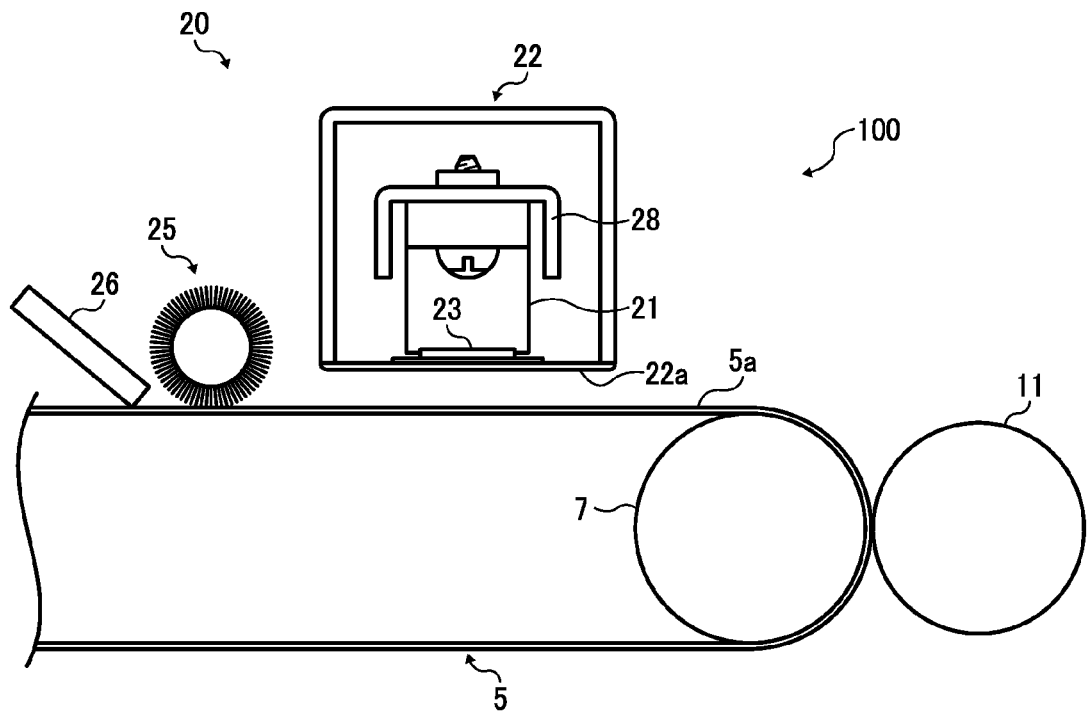
FIG. 1 is a side view illustrating an optical sensor unit according to Embodiment 1 of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

The terminology used herein is for describing particular embodiments and is not intended to be limiting of exemplary embodiments of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of the present invention. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of the present invention.

The present invention is applicable to any image forming apparatus, and is implemented in the most effective manner in an electrophotographic image forming apparatus.

In describing preferred embodiments illustrated in the drawings, specific terminology is employed for the sake of clarity. However, the disclosure of the present invention is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of the present invention are described.

[Embodiment 1]

Figure 2:
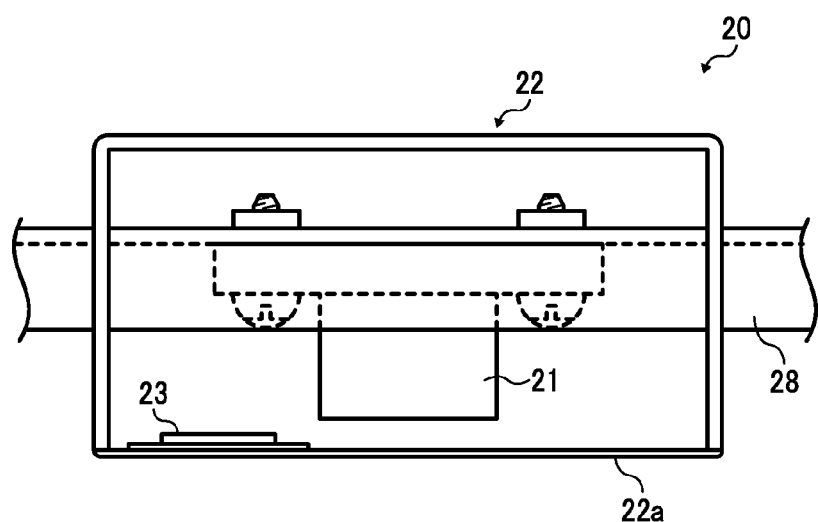
FIG. 2 is a front view illustrating the optical sensor unit of FIG. 1.
Figure 3:
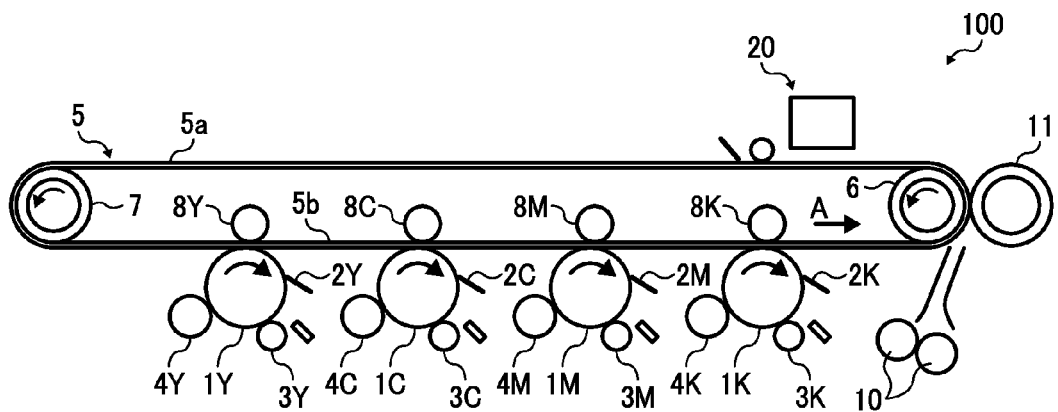
FIG. 3 is a diagram of a main portion of an image forming apparatus incorporating the optical sensor unit of FIG. 1.

Descriptions are given of an optical sensor unit 20 and an image forming apparatus 100 according to Embodiment 1 of the present invention, with reference to FIGS. 1 through 3.

FIG. 1 is a side view illustrating the optical sensor unit 20 according to Embodiment 1. FIG. 2 is a front view illustrating the optical sensor unit 20 of FIG. 1. FIG. 3 is a diagram of a main portion of the image forming apparatus 100 incorporating the optical sensor unit 20 of FIG. 1.

As illustrated in FIG. 3, the image forming apparatus 100 according to the present embodiment may be a copier, a facsimile machine, a printer, a multifunction printer having at least one of copying, printing, scanning, plotter, and facsimile functions, or the like. The image forming apparatus 100 may form an image by an electrophotographic method, an inkjet method, and/or the like. According to this embodiment, the image forming apparatus 100 functions as a tandem-type color printer for forming a color image on a recording medium by the electrophotographic method.

As illustrated in FIGS. 1 and 2, the optical sensor unit 20 according to Embodiment 1 includes a detecting portion 21, a dust-proofing member 22, a vibration member 23, a brush 25, an elastic blade 26, and a fixing member 28.

The image forming apparatus includes an intermediate transfer belt 5 having an outer surface 5a and an inner surface 5b as illustrated in FIG. 3. The intermediate transfer belt 5 functions as an endless belt shaped image carrier on which an image pattern is formed as a detection target to detect density and position of an end portion of an image. The optical sensor unit 20 is disposed facing down the outer surface 5a of the intermediate transfer belt 5 as illustrated in FIG. 1.

The image forming apparatus 100 includes the optical sensor unit 20, the intermediate transfer belt 5, belt rollers 6 and 7, and a transfer roller 11. A recording medium such as a paper passes between the transfer roller 11 and the intermediate transfer belt 5 to receive an image formed on the outer surface 5a of the intermediate transfer belt 5.

The detecting portion 21 includes a light emitting portion (i.e., a light source) that emits light to a detection target and a light receiving portion that receives the light emitted by the light emitting portion and reflected by the detection target. The detecting portion 21 transmits the intensity of the light received by the light receiving portion to an electric signal to be output to a non-illustrated controller. The detecting portion 21 is a groove screwed to the fixing member 28 that extends in a direction parallel to the outer surface 5a of the intermediate transfer belt 5.

The dust-proofing member 22 is formed by a resin material in a substantially box shape and covers the detecting portion 21. The dust-proofing member 22 includes a thru-beam part 22a as a surface formed by a transparent resin material, facing the intermediate transfer belt 5. The dust-proofing member 22 has openings, through which the fixing member 28 passes. The positions of the openings are determined by the fixing member 28.

In the present embodiment, the thru-beam part 22a is formed by a transparent resin material but is not limited thereto as long as the light from the detecting portion 21 transmits through the thru-beam part 22a. For example, when infrared light is used, the thru-beam part 22a can be formed by a non-transparent resin material, that is, by any material that transmits light emitted by the detecting portion 21.

The vibration member 23 includes known piezoelectric elements, for example. The vibration member 23 is mounted inside the thru-beam part 22a of the dust-proofing member 22 around a light pathway of the detecting portion 21 where the light pathway is not blocked. The vibration member 23 is controlled by the non-illustrated controller to remove residual toner remaining on an outer surface of the thru-beam part 22a and flying foreign materials by adding vibration to the thru-beam part 22a. It is to be noted that a vibration frequency of the vibration member 23 is preferably higher than the audio frequency (20 kHz or greater in general) to prevent noise.

The brush 25 functioning as a collecting member includes a bristle brush portion arranged in a circumferential direction of a rotary cylinder center along a rotary shaft thereof disposed parallel to a rotary shaft of the belt roller 7. The brush 25 is formed to have the substantially same width as the width of the intermediate transfer belt 5. The leading edge of the brush 25 contacts the outer surface 5a of the intermediate transfer belt 5. The brush 25 is disposed downstream from the dust-proofing member 22 in a moving direction of the intermediate transfer belt 5.

The elastic blade 26 functioning as a collecting member is formed in a strip shape by an elastic material such as rubber material. The elastic blade 26 is formed to have the substantially same width as the width of the intermediate transfer belt 5. The elastic blade 26 is disposed downstream from the brush 25 in the moving direction of the intermediate transfer belt 5. The elastic blade 26 has one end that contacts the intermediate transfer belt 5 and the other end that is fixed to tilt toward the moving direction of the intermediate transfer belt 5.

The vibration member 23 vibrates the thru-beam part 22a, so that the optical sensor unit 20 removes dust such as toner attached to the outer surface of the thru-beam part 22a and flying foreign material. The removed dust falls on the intermediate transfer belt 5 to be collected by the brush 25 and the elastic blade 26. Thus, the image forming apparatus 100 includes the intermediate transfer belt 5 that functions as a moving member to move the image pattern as a detection target to the optical sensor unit 20. The optical sensor 20 is disposed above the intermediate transfer belt 5, so that the duct falls from the thru-beam part 22a to the intermediate transfer belt 5 to be collected and conveyed by the intermediate transfer belt 5 to the brush 25.

As illustrated in FIG. 3, the image forming apparatus 100 including the above-described optical sensor unit 20 includes, in the main portion, a drum-shaped photoconductor 1, a cleaning unit 2, a charging unit 3, and a development unit 4.

The photoconductor 1 that functions as an image forming unit corresponds to four drum-shaped photoconductors 1Y, 1C, 1M, and 1K to form respective single color toner images for yellow (Y), cyan (C), magenta (M), and black (K), for example, according to image data.

The photoconductor 1 is an aluminum cylinder having a diameter of from 30 mm to 100 mm and an outer circumferential surface thereof is covered by an organic semiconductor layer that is a photoconductive material. As illustrated in FIG. 3, the respective upper portions of the photoconductors 1Y, 1C, 1M, and 1K contact the outer surface 5a of the intermediate transfer belt 5.

The cleaning unit 2 corresponds to four cleaning units 2Y, 2C, 2M, and 2K to scrape and remove residual toner remaining on the outer circumferential surface of the photoconductor 1 after transfer.

The charging unit 3 corresponds to four charging units 3Y, 3C, 3M, and 3K to uniformly charge the outer circumferential surface of the photoconductor 1 (i.e., the photoconductors 1Y, 1C, 1M, and 1K).

The development unit 4 corresponds to four development units 4Y, 4C, 4M, and 4K to develop an image formed on the charged outer circumferential surface of the photoconductor 1 (i.e., the photoconductors 1Y, 1C, 1M, and 1K) with toner.

The intermediate transfer belt 5 is stretched taut by the rollers 6 and 7 rotating counterclockwise so as to move in a direction indicted by arrow A in FIG. 3. Primary transfer units 8Y, 8C, 8M, and 8K are disposed in contact with the inner surface 5b of the intermediate transfer belt 5, facing the photoconductors 1Y, 1C, 1M, and 1K, respectively, with the intermediate transfer belt 5 interposed therebetween to form primary nip areas. The intermediate transfer belt 5 is an endless belt having a base part formed by a resin film or a rubber material with a thickness of from 50 mm to 600 mm, and has a resistance to transfer toner from the photoconductor 1 (i.e., the photoconductors 1Y, 1C, 1M, and 1K).

As illustrated in FIG. 1, the transfer roller 11 is disposed facing the roller 7 with the intermediate transfer belt 5 interposed therebetween. After an image formed on the photoconductor 1 is transferred by the primary transfer unit 8 onto the intermediate transfer belt 5, the transfer roller 11 then transfers the image onto a recording medium, the movement of which is controlled by registration rollers 10 to synchronize with movement of the image on the intermediate transfer belt 5.

The image forming apparatus 100 such as a copier or a printer further includes a scanner that performs photoelectric conversion of light reflected by an exposed document, a writing unit that projects laser light emitted by a light source to the photoconductor 1, a sheet feeding unit that feeds recording media, and a sheet discharging unit that discharges the recording media having an image formed thereon.

As illustrated in FIG. 3, the optical sensor unit 20 is disposed above the intermediate transfer belt 5 and facing down the outer surface 5a of the intermediate transfer belt 5.

In a known image density detector of used an intermediate transfer unit, a shutter has a cleaning unit in front of a detection surface to clean optical parts of an optical sensor unit by moving the shutter. Therefore, the optical parts are cleaned before and after detecting density detection patterns. Namely, the cleaning unit of the shutter causes the toner scattered from an image carrier and/or flying foreign materials to attach to the optical parts and remain unclean during detection of the density detection patterns.

Further, the toner and foreign materials removed by the cleaning unit are not collected, and therefore it is likely to attach to the optical parts again.

According to the present embodiment, the dust-proofing member 22 covers around the detecting portion 21 detecting an image pattern or image patterns to detect the image density and the position of an end portion of an image and includes the thru-beam part 22a that is a surface opposed to the intermediate transfer belt 5. Therefore, entrance of dust such as toner and flying foreign material can be prevented without blocking the light pathway of the detecting portion 21. Further, the vibration member 23 vibrates the thru-beam part 22a to remove dust attached to the thru-beam part 22a constantly, thereby maintaining the most preferable (optimal) detection accuracy during detection of the image pattern(s). Further, the removed dust can be collected by the brush 25 and the elastic blade 26, thereby preventing repeated adhesion of the duct to the thru-beam part 22a.

Further, the vibration frequency of the vibration member 23 is higher than the audio frequency. As a result, occurrence of unpleasant noise due to vibration of the thru-beam part 22a by the vibration member 23 can be prevented.

[Embodiment 2]

Figure 4:
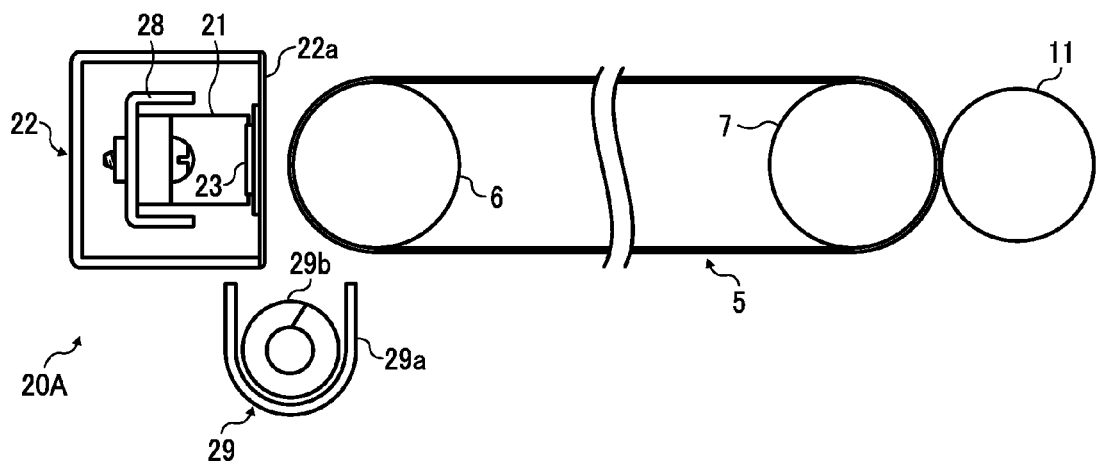
FIG. 4 is a side view of an optical sensor unit according to Embodiment 2.

Next, a description is given of an optical sensor unit 20A according to Embodiment 2, with reference to FIG. 4.

Elements and units in Embodiment 2 have the same reference numerals and symbols as those in Embodiment 1 and the description thereof is omitted.

FIG. 4 is a side view of the optical sensor unit 20A according to Embodiment 2.

As illustrated in FIG. 4, the present embodiment shows a configuration in which the optical sensor unit 20A is disposed on one side of the intermediate transfer belt 5, the thru-beam part 22a of the dust-proofing member 22 facing the outer surface 5a of the intermediate transfer belt 5.

The optical sensor unit 20A in Embodiment 2 is similar to the optical sensor unit 20 in Embodiment 1, except that the dust-proofing member 22 and the detecting portion 21 and the vibration member 23 accommodated inside the dust-proofing member 22 in the optical sensor unit 20A are disposed on one side of the intermediate transfer belt 5. Further, the optical sensor unit 20A in Embodiment 2 includes a collection coil 29 functioning as a collecting member.

The collection coil 29 includes a U-shaped tubular body 29a and a coil portion 29b. The collection coil 29 causes the dust such as toner and flying foreign material removed by the vibration member 23 to fall into the U-shaped tubular body 29a. A non-illustrated drive unit or the like rotates the coil portion 29b to move the dust to an edge of the U-shaped tubular body 29a to convey and collect the dust into the U-shaped tubular body 29a.

According to the present embodiment, since the collection coil 29 is used as a collecting member, even when the optical sensor unit 20A is disposed on one side of the intermediate transfer belt 5. As a result, the dust such as toner and flying foreign material removed by the vibration member 23 can be collected reliably.

[Embodiment 3]

Figure 5:
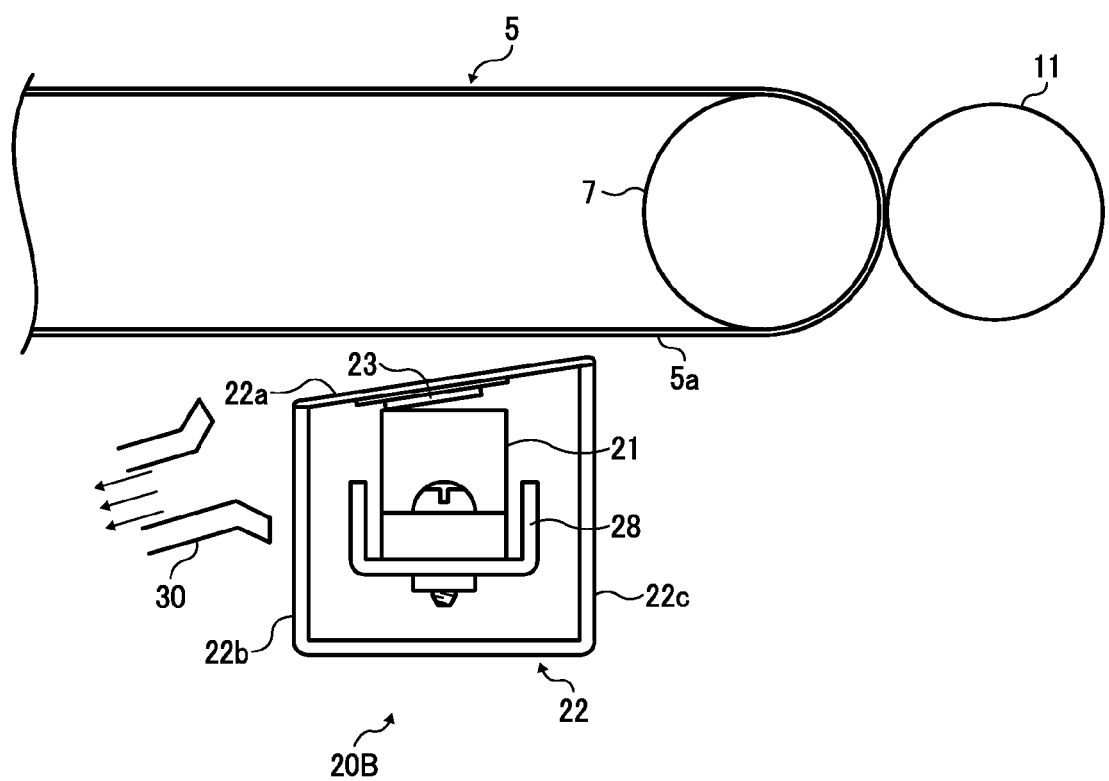
FIG. 5 is a side view of an optical sensor unit according to Embodiment 3.

Next, a description is given of an optical sensor unit 20B according to Embodiment 3, with reference to FIG. 5.

Elements and units in Embodiment 3 have the same reference numerals and symbols as those in Embodiments 1 and 2, and the description thereof is omitted.

FIG. 5 is a side view of the optical sensor unit 20B according to Embodiment 3.

As illustrated in FIG. 5, the present embodiment shows a configuration in which the optical sensor unit 20B is disposed below the intermediate transfer belt 5, with the thru-beam part 22a of the dust-proofing member 22 facing up the lower part of the outer surface 5a of the intermediate transfer belt 5.

In addition to the position, the optical sensor unit 20B according to Embodiment 3 is different from the optical sensor unit 20 according to Embodiment 1 and the optical sensor unit 20A according to Embodiment 2 as follows. The thru-beam part 22a of the dust-proofing member 22 is arranged not parallel to but slanted to the outer surface 5a of the intermediate transfer belt 5. The optical sensor unit 20B includes a nozzle 30 that functions as a suction member and a collecting member. By sucking air around the dust-proofing member 22, the dust including toner and flying foreign material is collected.

The nozzle 30 is disposed on one side of the dust-proofing member 22 and has an inlet opening disposed slanted toward the thru-beam part 22a of the dust-proofing member 22.

The dust-proofing member 22 is disposed slanted such that a gap between the thru-beam part 22a on the side the nozzle 30 is disposed and the intermediate transfer belt 5 becomes greater. Namely, the dust-proofing member 22 has sidewalls 22b and 22c having different height. The height of the sidewall 22b disposed on the side the nozzle 30 is disposed is lower than the height of the sidewall 22c disposed opposite the sidewall 22b. By so doing, the dust such as toner and flying foreign material removed by the vibration member 23 can fall on the side near the nozzle 30 easily, thereby enhancing a collection efficiency by the nozzle 30.

It is to be noted that the dust-proofing member 22 is not limited to cause the thru-beam part 22a to be inclined. For example, the dust-proofing member 22 may be fixed such that the whole dust-proofing member 22 is slanted toward the nozzle 30 in the configurations of Embodiments 1 and 2. In that case, the detecting portion 21 (the fixing member 28) is not disposed slanted.

According to the present embodiment, the optical sensor unit 20B includes the nozzle 30 as a suction member and a collecting member to suck air to collect the dust such as toner and flying foreign material. Therefore, when the optical sensor unit 20B is disposed facing up to the outer surface 5a of the intermediate transfer belt 5, that is, when the optical sensor unit 20B is disposed below the intermediate transfer belt 5 functioning as the endless belt shaped image carrier, the dust can be collected effectively.

In the above-described embodiments, the thru-beam part 22a may have surface treatment such as fluororesin coating on the outer surface thereof so as to prevent adhesion of dust such as toner and flying foreign material and to facilitate removal of the dust. By so doing, even when the vibration member 23 stops at the power off, the amount of dust attached to the thru-beam part 22a due to charging attraction and humidity is reduced. Even if the dust is attracted to the thru-beam part 22a, the removal of the dust can be performed easily.

In the above-described embodiments, the dust-proofing member 22 has the thru-beam part 22a that is the whole part of the surface facing the intermediate transfer belt 5. However, the configuration of the dust-proofing member 22 is not limited thereto. For example, at least a portion that intersects the pathway of light that is emitted from the detecting portion 21 may be transparent (e.g., a configuration in which light emitted from the detecting portion 21 may be transmitted).

In Embodiments 1, 2, and 3, the vibration member 23 is disposed inside the dust-proofing member 22 but is not limited thereto. For example, the vibration member 23 may be disposed outside the dust-proofing member 22, that is, on the outer surface of the thru-beam part 22a. Further, more than one vibration member 23 may be disposed inside or outside the dust-proofing member 22.

The collecting member in Embodiments 1, 2, and 3 may be used in a direction of attachment other than the illustrated direction. For example, air suction by the nozzle 30 may be employed in Embodiment 1 or 2 and the collection coil 29 may be used in Embodiment 3.

The above-described embodiments are illustrative and do not limit the present invention. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. An image forming apparatus comprising:
an image forming unit including an image carrier configured to form an image pattern on the image carrier; and
an optical sensor facing the image carrier, the optical sensor including,
a detecting portion disposed facing a detection target and configured to detect the detection target by emitting light to the detection target,
a dust-proofing member having a surface disposed facing the detection target and configured to cover the detecting portion,
a vibration member configured to vibrate the surface of the dust-proofing member, and
a collecting member configured to collect dust in the vicinity of the dust-proofing member, wherein,
on the surface of the dust-proofing member facing the detection target, at least a portion that intersects a pathway of light emitted from the detection portion is formed as a thru-beam part by a material through which the light transmits.

2. The image forming apparatus according to claim 1, wherein a vibration frequency of the vibration member is higher than an audio frequency of 20 kilohertz (kHz).

3. The image forming apparatus according to claim 1, wherein the collecting member includes a brush member and an elastic member formed in a strip shape.

4. The image forming apparatus according to claim 1, wherein the collecting member includes a collection coil.

5. The image forming apparatus according to claim 1, wherein the collecting member includes an air suction member that sucks air around the dust-proofing member.

6. The image forming apparatus according to claim 1, wherein the thru-beam part has surface treatment to prevent adhesion of dust.

7. The image forming apparatus according to claim 1, wherein the thru-beam part has surface treatment to remove the dust easily.

* * * * *